(12) United States Patent
Shaw

(10) Patent No.: US 8,206,579 B1
(45) Date of Patent: Jun. 26, 2012

(54) AQUARIUM FILTRATION SYSTEM

(76) Inventor: Leon Shaw, Whitmore, MI (US)

( * ) Notice: Subject to any disclaimer, the term of this patent is extended or adjusted under 35 U.S.C. 154(b) by 464 days.

(21) Appl. No.: 12/586,572

(22) Filed: Sep. 24, 2009

Related U.S. Application Data

(60) Provisional application No. 61/192,906, filed on Sep. 24, 2008.

(51) Int. Cl.
*A01K 63/04* (2006.01)
*B01D 33/70* (2006.01)
*B01D 33/80* (2006.01)
*B01D 35/00* (2006.01)
*C02F 1/44* (2006.01)

(52) U.S. Cl. .............. 210/167.21; 210/151; 210/153; 210/167.01; 210/167.24; 210/637; 119/259; 119/260

(58) Field of Classification Search .................. None
See application file for complete search history.

(56) References Cited

U.S. PATENT DOCUMENTS

| | | |
|---|---|---|
| 3,468,288 A | 9/1969 | Cassil |
| 3,929,101 A | 12/1975 | Katz |
| 5,059,315 A | 10/1991 | Senape |
| 5,097,795 A | 3/1992 | Adey |
| 5,474,673 A | 12/1995 | Ludlow |
| 6,044,903 A | 4/2000 | Heilman et al. |
| 6,106,709 A | 8/2000 | Bresolin |
| 6,202,677 B1 | 3/2001 | Chen et al. |
| 6,843,909 B1 | 1/2005 | Woltmann |
| D526,747 S | 8/2006 | Thomsen et al. |
| 7,314,561 B2 | 1/2008 | Jensen et al. |

*Primary Examiner* — Krishnan S Menon
*Assistant Examiner* — Dirk Bass
(74) *Attorney, Agent, or Firm* — Montgomery Patent & Design, LLC; Robert C. Montgomery; Joseph T. Yaksich

(57) ABSTRACT

An aquarium filtration system with enhanced features comprising a continuous flow of filtered and processed water as well as a continuous drain system is herein disclosed. In such a manner, the water is continually changed over time, thus minimizing required emptying and/or cleaning. Additionally the system holds and maintains the desired pH level and water hardness, while controlling ammonia and nitrite levels. A filter on the incoming water line removes chlorine and other chemicals before the water passes onto the aquarium. The system works in conjunction with a conventional automatic water level controller. Automatic check valves control water flow and prevent back flow.

9 Claims, 3 Drawing Sheets

AQUARIUM FILTRATION SYSTEM

RELATED APPLICATIONS

The present invention was first described in and claims the benefit of U.S. Provisional Application No. 61/192,906, filed Sep. 24, 2008, the entire disclosures of which are incorporated herein by reference.

FIELD OF THE INVENTION

The present invention relates generally to aquarium filtration systems, and more particularly, to an aquarium filtration system with enhanced features that continually changes the aquarium water over time maintaining equilibrium and minimizing required emptying or cleaning.

BACKGROUND OF THE INVENTION

The first fish to be brought indoors was done so by the Romans, who kept these fish in small tanks made of marble. With the introduction of glass and porcelain the modern fish bowl was created. Over time tanks for housing and maintaining tropical fish, aquatic plants, and other aquatic life were introduced making keeping fish in an aquarium a popular hobby. Improvements in aquariums and the increased availability of electricity for lighting, aeration, filtration, and heating of the water have led to an estimated sixty million aquarists worldwide, making aquarium keeping the second most popular hobby after stamp collecting in the United States.

While keeping fish can be rewarding and relaxing, maintaining the aquarium can be a daunting task, requiring the aquarist to regularly clean and maintain the tank for the health and benefit of the fish. One (1) important facet of this care is the filtration system, which operates to reduce or remove contaminants and to improve oxygenation of the water. Various filtration systems are commonly used to remove the waste from excrement and respiration of the fish. These systems include biological, mechanical, and chemical filtration or some combination to manage the nitrogen cycle of the aquarium and remove particular material from the water. Regardless of the type of filter that is used, all filters require regular maintenance. This maintenance includes not only filter maintenance, but often an entire emptying of the tank for a thorough cleaning. The tank cleaning is often required because even the best filtration system cannot remove all contaminants over time, and these contaminants build up and cause a hazardous environmental condition for the fish.

The prior art includes various examples of aquarium filtration systems which can be seen by example in several U.S. Patents.

U.S. Pat. No. 3,929,101, issued in the name of Katz, describes a filtration and circulation system and apparatus to purify aquatic media and maintain the aquatic specimens having biological and mechanical filtration and algae propagation.

U.S. Pat. No. 5,059,315, issued in the name of Senape, describes an aquarium water aeration and filtering system to sustain aquatic species having a suction pump and a non-submerged column of filtering layers, where the water drip filters until degasification is complete.

U.S. Pat. No. 5,097,795, issued in the name of Adey, describes a water purification system and apparatus having an algal turf scrubber screen and a rotating water receptacle which removes carbon dioxide and dissolves pollutants.

U.S. Pat. No. 5,474,673, issued in the name of Ludlow, describes a top mounted biological filtration system for an aquarium having a wet/dry filter system that mounts to the open top portion of an aquarium.

U.S. Pat. No. 6,106,709, issued in the name of Bresolin, describes a filtering device for aquariums having a casing that hangs on the outside of an aquarium with at least one filtering mass, a pump, and a water return.

U.S. Pat. No. 6,202,677, issued in the name of Chen et al., describes a multi-functional cleaning and filtering system for aquarium tank having an inlet water controller, a suction unit, and a filter container.

While these examples fulfill their respective, particular objectives, each suffers from one or more disadvantages or deficiencies. Problems with the clogging of the filtering media and water supply continue to occur which can lead to difficulty in maintaining proper water conditions. Additionally the flow, rate of the various examples may not effectively maintain desired water conditions which can lead to the accumulation of algae and other contaminants. Furthermore, complex devices with multiple components tend to have higher rates of malfunction and still require regular full tank cleanings.

Accordingly, there is a need for a means by which aquariums for holding or displaying fish can be kept cleaner at all times without the need for regular and continuous maintenance. The development of the present invention substantially departs from the conventional solutions and in doing so fulfills this need.

SUMMARY OF THE INVENTION

In view of the foregoing references, the inventor recognized the aforementioned inherent problems and observed that there is a need for water filtration system for aquariums that requires a minimal amount of maintenance and which provides a continuous flow of fresh water to the system to maintain healthier aquatic specimen and requires less oversight by the aquarist and thus, the object of the present invention is to solve the aforementioned disadvantages and provide for this need.

Another object of the present invention is to provide a system that utilizes a continuous fresh water feed and a continuous drain which enables larger amounts of water to be continuously changed over time.

Another object of the present invention is to provide a system that does not require full tank emptying and cleaning.

Another object of the present invention is to provide a system that maintains a desired pH, water hardness, ammonia, and nitrate level in the aquatic bio-system.

To achieve the above objectives, the present invention provides reduced maintenance aquarium filtration system and a method of use thereof, which provides enhanced features generally comprising a continuous fresh water feed line, a plurality of filters, and continuous waste water drainage. In such a manner, the water in the aquarium is continually changed over to maintain a constant water level and thus never requires emptying or cleaning. In addition to particulate filtration and water replacement, the system maintains a desired pH level, water hardness, ammonia level, and nitrite level. A cartridge filter on the incoming water line removes chlorine and other chemicals before processed water enters the aquarium. The system works in conjunction with an existing water level overflow unit to maintain a safe maximum water level within the aquarium. A plurality of valves provides a controlled flow of process water into the aquarium while preventing a back flow condition.

It is a feature of the present invention to provide an incoming water line and a cartridge filter that is in fluid communication with the incoming water line for removing chlorine from the water.

Another feature of the present invention is a reverse osmosis (RO) filter that is in fluid communication with the cartridge filter and a potential of hydrogen (pH) level control mechanism that is in fluid communication with the cartridge and the RO filters.

Yet still another feature of the present invention is a plurality of valves that are in fluid communication with the cartridge filter and the RO filter for controlling the flow of water into the aquarium while preventing back flow of water out from the aquarium.

Yet still another feature of the present invention is a waste water drain line that is in fluid communication with the RO filter for directing the waste water byproduct away from the aquarium water filtration system.

The present invention provides a method of utilizing the system that provides for a cleaner fish tank at all times in a manner which is quick, easy and effective.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

| DESCRIPTIVE KEY | |
|---|---|
| 10 | reduced maintenance aquarium filtration system |
| 20 | water supply plumbing |
| 22 | supply valve |
| 24 | cartridge filter |
| 30 | first automatic valve |
| 32 | second automatic valve |
| 40 | reverse osmosis (RO) filter |
| 42 | RO filter drain valve |
| 50 | holding line |
| 52 | process water control valve |
| 54 | process water plumbing |
| 55 | goose-neck" fixture |
| 56 | large diameter conduit |
| 58 | small diameter conduit |
| 70 | pH mixing chamber |
| 72 | pH control valve |
| 80 | piping/tubing |
| 82 | "T" fitting |
| 85 | plumbing adapter |
| 90 | supply water |
| 95 | process water |
| 96 | waste water |
| 100 | panel |
| 105 | standoff/fastener |

| DESCRIPTIVE KEY | |
|---|---|
| 110 | bracket |
| 120 | cabinet |
| 130 | aquarium |
| 135 | water level |
| 140 | fish |

DETAILED DESCRIPTION OF THE PREFERRED EMBODIMENT

Figure 1:
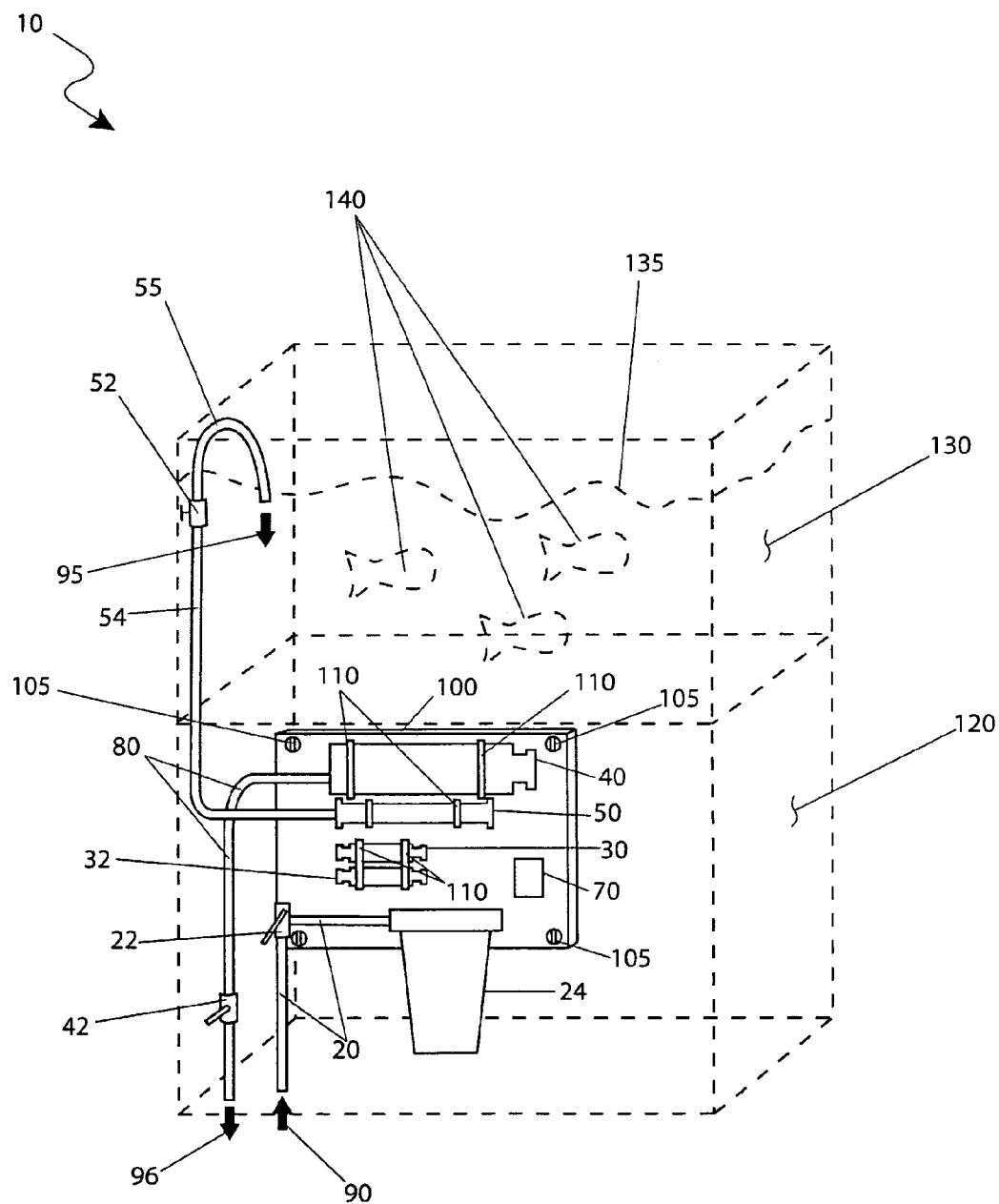
FIG. 1 is an environmental view of a reduced maintenance aquarium filtration system 10, according to a preferred embodiment of the present invention.
Figure 2:
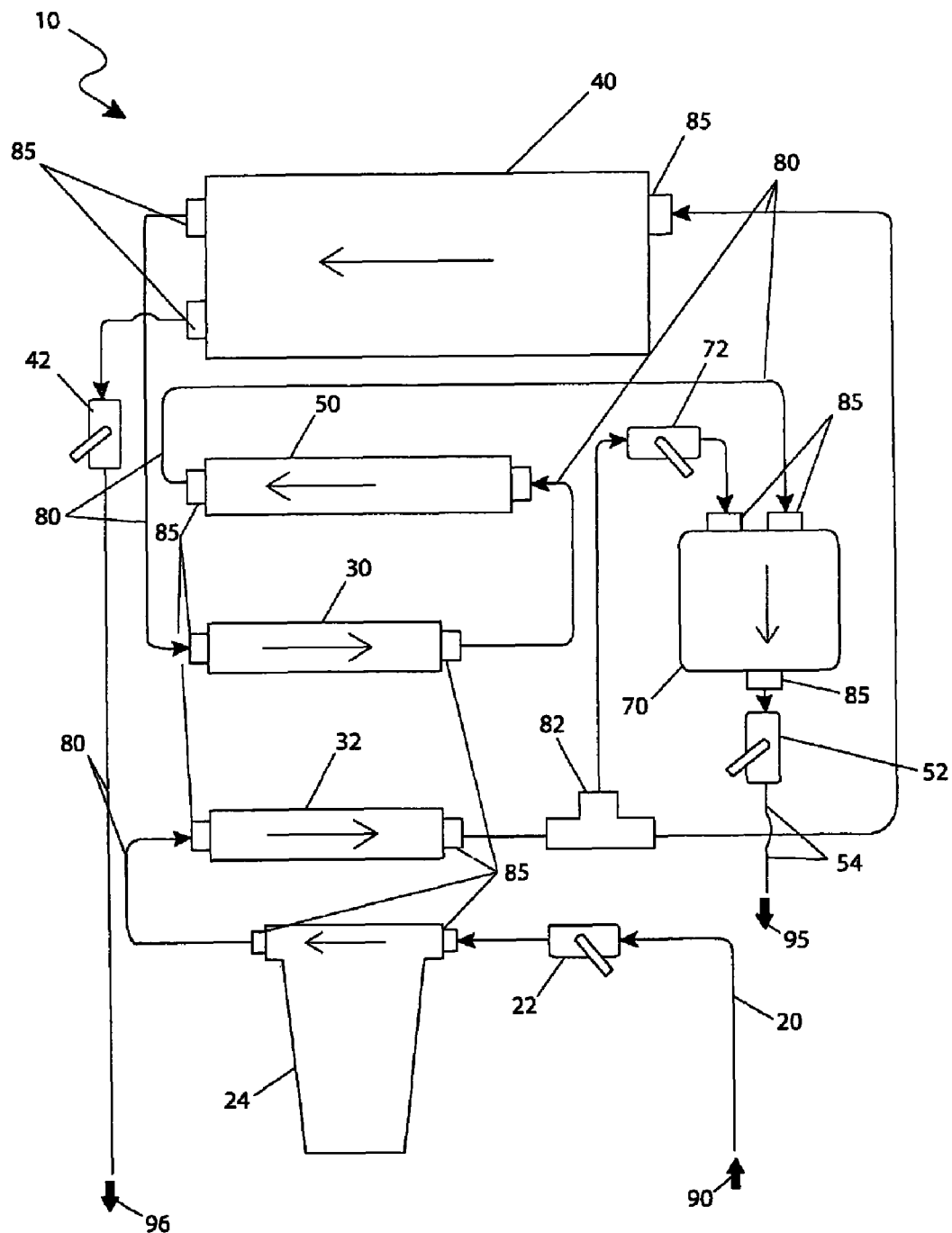
FIG. 2 is a plumbing diagram of the reduced maintenance aquarium filtration system 10 depicting major components, according to a preferred embodiment of the present invention; and, FIG. 3 is a section view of a holding line portion 50 of the reduced maintenance aquarium filtration system 10, according to a preferred embodiment of the present invention.
Figure 3:
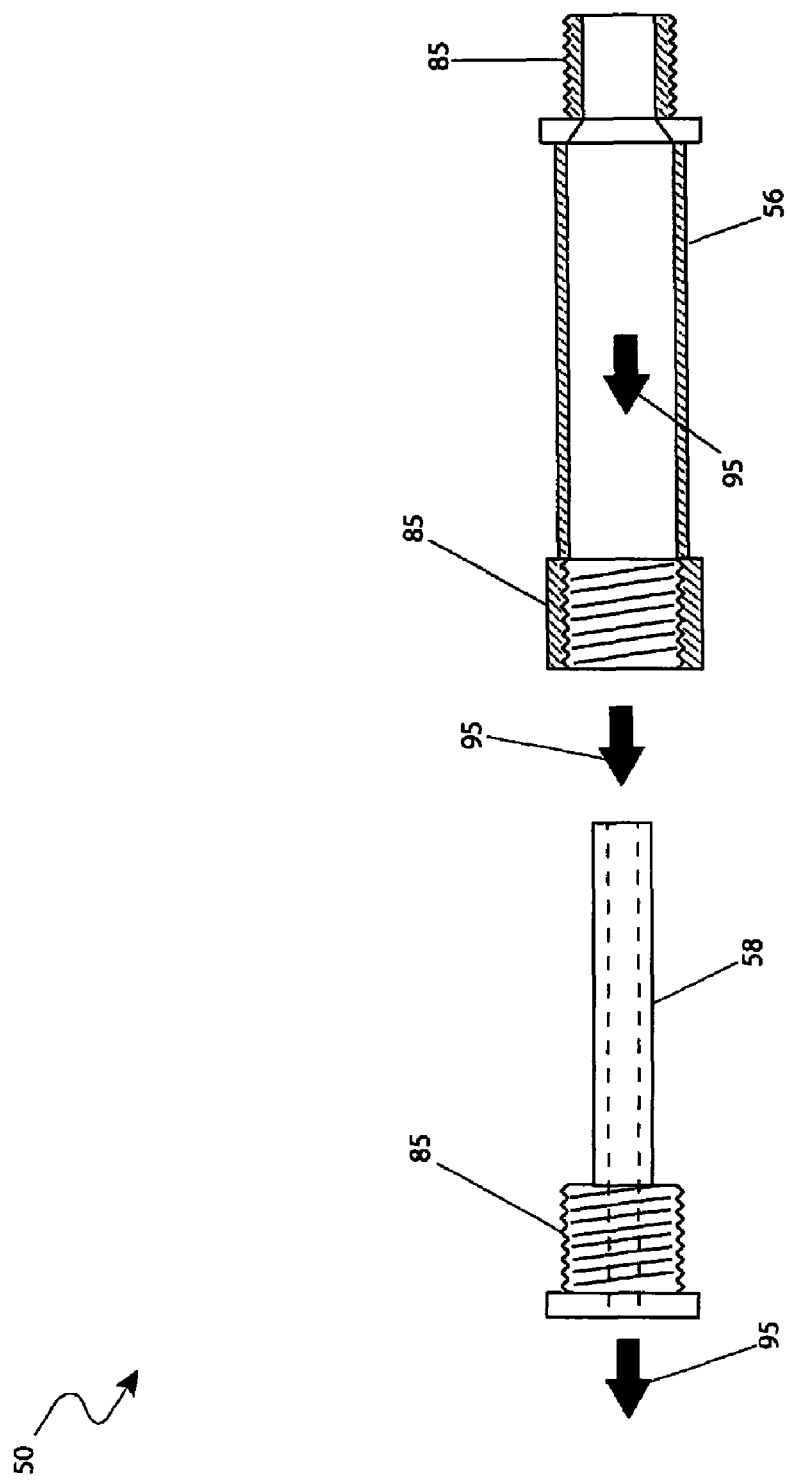

The best mode for carrying out the invention is presented in terms of its preferred embodiment, herein depicted within FIGS. 1 through 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a reduced maintenance aquarium filtration system (herein described as the "system") 10, and a method of use thereof, which provides enhanced features comprising a continuous fresh water feed line 20, a plurality of filters, a potential of hydrogen (pH) level control means, and continuous waste water 96 drainage. In such a manner, the water 135 therein the aquarium 130 is continually changed over to maintain a constant water level and thus never requires emptying or cleaning. In addition to particulate filtration and water replacement, the system 10 maintains a desired pH level, water hardness, ammonia level, and nitrite level. A cartridge filter 24 on the incoming water line 20 removes chlorine and other chemicals before processed water 95 enters an aquarium 130. The system 10 works in conjunction with an existing water level overflow unit to maintain a safe maximum water level 135 within the aquarium 130. A plurality of valves provides a controlled flow of process water 95 thereinto the aquarium 130 while preventing a back flow condition.

Referring now to FIG. 1, an environmental view of the system 10, according to the preferred embodiment of the present invention, is disclosed. The system 10 provides a water replacement means thereto various sizes of conventional aquariums 130 by supplying a consistent flow of process water 95 thereinto. The system 10 comprises water supply plumbing 20, a supply control valve 22, a cartridge filter 24, an RO filter 40, a holding line 50, and a pH mixing chamber 70. The system 10 is depicted here being discreetly enclosed therewithin a supporting cabinet 120 being subjacent thereto a common rectangular aquarium 130; however, it is understood that a number of functional and aesthetic locations of the system 10 with regards to the aquarium 130 may be utilized based upon particular aquarium 130 arrangements and user's preferences and as such, should not be interpreted as a limiting factor of the invention 10. It is further understood that due to the pressurized characteristics of the system 10, that the system 10 may also be located some distance therefrom said aquarium 130 while providing equal effectiveness.

Furthermore, particular relative positions of major components of the system 10 may be arranged in various locations and interconnected using piping/tubing 80 based upon space limitations and/or available mounting surfaces. Supply water 90 is introduced thereinto the system 10 via the pressurized water supply plumbing 20, thereby being unaffected by gravity. It is further understood that the system 10 is to work in conjunction with an existing automatic maximum water level control unit to prevent overflowing. A domestic potable flow of supply water 90 is provided thereto the system 10 via the water supply plumbing 20 being preferably in fluid communication therewith a standard household water supply; however, other water supply means may be provided such as, but not limited to: a pond, a lake, or the like. Said supply water 90 is to be utilized as a shut off means to enable system 10 maintenance or other necessary interruptions to service.

The system 10 provides a processing means thereto said supply water 90 to produce process water 95 via multiple in-line filtration devices preferably being mounted thereto a single rectangular panel 100 via a plurality of mounting fixtures and brackets 110 which may be utilized to assemble the system 10. Said brackets 110 may be fabricated using plastic or stainless steel sheet stock, or may be supplied therewith any commercially available system components; however, it is understood that said components of the system 10 may be affixed thereto a variety of fabricated or existing structures utilizing one (1) or more mounting panels 100 based upon particular installation requirements and available space and as such should not be interpreted as a limiting factor of the invention 10. Furthermore, the panel 100 is envisioned being attached thereto a convenient surface being adjacent thereto the system 10 or thereat a remote location using a plurality of standoff/fasteners 105 allowing various piping/tubing 80 to be routed behind said panel 100 if desired. Once the process water 95 is processed as previously described, a resultant flow of process water 95 is then delivered via internal water pressure thereinto the aquarium 130 via a length of process water plumbing 54 and a "goose-neck fitting" 55 being attached thereto an end portion. Said "goose-neck fitting" 55 comprises a semi-rigid inverted "U"-shaped conduit secured therealong an upper edge portion of the aquarium 130 and being made preferably of molded plastic or stainless steel; however, other means of gently introducing said process water flow 95 thereinto the aquarium 130 may be utilized being above or below a water level 135 and comprising various commercially available fluid diffusing and distribution devices which may be designed to prevent possible temperature shock to fish 140 occupying the aquarium 130, and as such should not be considered a limiting factor of the invention 10. The major components of the system 10 may be fabricated using stainless steel or plastic materials such as polyvinylchloride (PVC), polyethylene, or equivalent anti-microbial materials.

Referring now to FIG. 2, a plumbing diagram of the system 10 depicting major components, according to the preferred embodiment of the present invention, is disclosed. The system 10 further comprises a first automatic valve 30, a second automatic valve 32, an RO filter drain valve 42, a process water valve 52, a pH control valve 72, and a plurality of interconnecting piping/tubing 80. The automatic valves 30, 32 provide a means of stopping a flow of process water 95 through the system 10 based upon a loss of inlet pressure. The automatic valves 30, 32 comprise a pair of standard spring-loaded fluid pressure activated check valves common in the industry. In an event of the process water control valve 52 being closed, pressure within the system 10 will be equalized and cause the automatic valves 30, 32 to close, thereby preventing a forward or backward flow of process water 95 within the system 10.

The system 10 provides sequential filtration and pH balancing thereto the process water 95. The plumbing diagram shown here illustrates a specific sequence of water processing comprising coarse water filtration via a cartridge filter 24; filtration via an RO filter 40; and, pH level adjustment via a pH mixing chamber 70. It must be noted that the major components of the system 10 are illustrated here having a generic arrangement for illustration sake. Although said components 24, 30, 32, 40, 50, 70 are to be in fluid communication therewith each other in a particular sequence in order to produce desired process water 95, actual arrangement of said components 24, 30, 32, 40, 50, 70 and interconnecting piping/tubing 80 may take on any number of different configurations as previously described. As supply water 90 enters the system 10 via the aforementioned water supply plumbing 20, primary filtration takes place as the process water 95 passes therethrough a common commercially available cartridge filter unit 24 which reduces or eliminates substances such as, but not limited to: impurities, solids, rust, minerals, chlorine, oil, and the like. Secondary filtration of said process water 95 is accomplished via the RO filter unit 40 which reduces or eliminates chlorine, ammonia, and nitrite levels as well as providing effective control of pH levels when working in conjunction therewith the pH mixing chamber 70. Said RO filter 40 produces a flow of waste water 96 in a conventional manner which is envisioned being routed thereto a floor drain or other suitable disposal system within the household.

The pH mixing chamber 70 provides a user selectable and controllable pH balance thereto the process water 95 immediately preceding entry thereinto the aquarium 130. The mixing chamber 70 comprises a cylindrical vessel approximately two (2) inches in diameter and approximately six (6) inches long having two (2) inlet connections and one (1) outlet connection. The pH mixing chamber 70 receives a flow of process water 95 therefrom the cartridge filter 24 and from the RO filter 40 being in fluid communication therewith. Obtaining a desired pH level of the process water 95 as it enters the aquarium 130 is accomplished by mixing the low pH process water 95 flowing therefrom the RO filter 40 therewith the higher pH process water 95 flowing therefrom the cartridge filter 24 in a proportionally controlled manner using the manually adjustable pH control valve 72. The outlet connection portion of the pH mixing chamber 70 provides process water 95 thereto the aquarium 130 having a desired pH level. The desired pH is maintained by periodically testing the pH level of the process water 95 as it exits the processed water plumbing 54 and adjusting the pH control valve 72 accordingly.

The holding line 50 works in conjunction therewith the RO filter 40 providing a backpressure means thereto an output side of the RO filter 40, thereby allowing said RO filter 40 to function in an expected manner (see FIG. 3). The process water control valve 52 is arranged in-line thereto the processed water plumbing 54 immediately preceding entry of said process water 95 thereinto the aquarium 130. Said process water control valve 52 provides overall fluid flow regulation thereto the entire system 10 allowing a volume of process water 95 to enter the aquarium 130 in a volumetrically adjustable and selectable manner being proportional thereto an internal volume of various aquariums 130 having widely differing internal fluid volumes.

The major components of the system 10 are in fluid communication therewith one another via interconnecting piping/tubing 80 which is envisioned being made using materials such as, but not limited to: stainless steel, polyethylene, polyvinylchloride (PVC), nylon, or the like. The major components of the system 10 further comprise various plumbing fittings such as, but not limited to: plumbing adapters 85, "T"-fittings 82, and other common fittings typically used to assemble and connect fluid systems. Said fittings 85, 82 are envisioned to utilize removably attachable threaded or glued plumbing or tubing connections, thereby providing a sealing and/or disassembly means thereto the system 10. Said fittings 85, 82 are envisioned being made using common materials used for fluid conveyance such as PVC, brass, stainless steel, or the like.

Referring now to FIG. 3, a section view of a holding line portion 50 of the system 10, according to a preferred embodiment of the present invention, is disclosed. The holding line 50 comprises a back-pressure device providing a metered flow of process water 95 therefrom the system 10 while maintaining a required back-pressure thereto the downstream side of the membrane portion of the RO filter 40, thereby enabling normal reverse osmosis water processing to occur. The holding line 50 comprises an assembly of two (2) PVC plumbing sections including a large diameter conduit 56 and a small diameter conduit 58, being threadingly engaged thereto each other via a plumbing adapter 85. The process water 95 enters the large diameter conduit 56 and is subsequently forced therethrough the small diameter conduit 58, thereby producing a resistance to flow and a resultant pressurization of the process water 95 therewithin the large diameter conduit 56 which is in turn applied thereto the downstream side of the membrane portion of the RO filter 40.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIGS. 1 and 2.

The method of installing and utilizing the system 10 may be achieved by performing the following steps: installing the water supply plumbing 20 and shut-off supply valve 22 in a desired proximity thereto an anticipated location of the system 10, thereby minimizing a required length of piping/tubing 80; mounting all major components of the system 10 including the cartridge filter 24, the two (2) automatic valves 30, 31, the RO filter 40, the holding line 50, and the pH mixing chamber 70 thereto one (1) or more panels 100 using fabricated or provided brackets 110, if not previously mounted; mounting the pre-assembled panel 100 thereto a desired location therein a residence being in proximity thereto the aquarium 130 using the standoff/fasteners 105; interconnecting all major components of the system 10 using provided piping/tubing 80 and plumbing adapters 85; connecting the drain piping/tubing 80 and RO filter drain valve 42 thereto an existing trapped waste water drain to dispose of waste water 96 therefrom the RO filter 40; routing the processed water plumbing 54 therefrom the outlet connection of the pH mixing chamber 70 thereto the process water control valve 52; affixing a "goose-neck fitting" 55 or other water diffusing device therealong an upper lip portion of the aquarium 130; remotely pressurizing the water supply plumbing 20; opening the supply valve 22 to initiate a flow of supply water 90 into the system 10; opening the processed water valve 52, if not previously opened; measuring a pH level of the produced process water 95; opening or closing the pH control valve 72 incrementally as required to obtain a desired measured pH level; monitoring a flow of process water 95 therefrom the processed water plumbing 54; adjusting the processed water control valve 52 to obtain a desired volumetric flow rate of process water 95 thereinto the aquarium 130; performing normal periodic maintenance thereto the filtration devices; performing periodic pH measurement of the process water 95 and adjusting the pH control valve 72 as required to restore a desired pH level; and, benefiting from improved aquarium water quality and reduced maintenance over an extended period of time while applying the present invention 10 thereto one's aquarium 130.

In an event of the process water control valve 52 being manually closed, pressure within the system 10 will be equalized and cause the automatic valves 30, 32 to close, thereby preventing a forward or backward flow of process water 95 within the system 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An aquarium water filtration system for sequentially filtrating and balancing a water pH level in an aquarium while cooperating with an existing water level overflow unit of the aquarium for maintaining a maximum water level within the aquarium, said aquarium water filtration system comprising:

an incoming water line and a cartridge filter in fluid communication with said incoming water line for removing chlorine from water;

a reverse osmosis (RO) filter in fluid communication with said cartridge filter;

a potential of hydrogen (pH) level control mechanism in fluid communication with said cartridge and RO filters, said pH control mechanism maintaining a desired pH level, water hardness level, ammonia level, and nitrite level in said water, said pH level control mechanism comprising a pH mixing chamber having two inlet connections and one outlet connection such that said pH mixing chamber receives water from said cartridge filter and said RO filter respectively, said mixing chamber receiving water from said cartridge filter via a manually adjustable pH control valve, wherein said desired pH level of said water is accomplished and maintained by mixing low pH water flowing from said RO filter with high pH water flowing from said cartridge filter in a proportionally controlled manner using said manually adjustable pH control valve, wherein said outlet connection of said pH mixing chamber provides water to said aquarium at said desired pH level;

a plurality of valves in fluid communication with said cartridge filter and said RO filter for controlling a flow of said water into said aquarium while preventing back flow of said water out from said aquarium; and a waste water drain line in fluid communication with RO filter for directing waste water byproduct away from said aquarium filtration system.

2. The aquarium water filtration system of claim 1, wherein said valves comprise:
   a process water control valve located downstream of said pH level control mechanism;
   first and second automatic control valves located upstream and downstream of said RO filter respectively; and
   an incoming water supply control valve located upstream of said cartridge filter.

3. The aquarium water filtration system of claim 2, wherein said valves further comprise:
   a process water valve located downstream of said pH level control mechanism; and,
   an RO filter drain valve located downstream of said RO filter and being in fluid communication with said waste water drain line;
   wherein said first and second automatic control valves, when manually closed, equalize pressure within said aquarium water filtration system such that forward and backward flow of said water is prohibited within said aquarium water filtration system.

4. The aquarium water filtration system of claim 3, further comprising;
   a holding line is located downstream of said RO filter and is in fluid communication with said RO filter for providing backpressure to an output of the RO filter, said holding line including a large diameter conduit, a plumbing adapter, and a small diameter conduit engaged with said large diameter conduit via said plumbing adapter;
   wherein said water enters said large diameter conduit and is subsequently forced through said small diameter conduit thereby producing water flow resistance and pressurization of said water within said large diameter conduit which is in turn applied to a downstream side of said RO filter.

5. An aquarium water filtration system for sequentially filtrating and balancing a water pH level in an aquarium while cooperating with an existing water level overflow unit of the aquarium for maintaining a maximum water level within the aquarium, said aquarium water filtration system comprising:
   an incoming water line and a cartridge filter in fluid communication with said incoming water line for removing chlorine from water;
   a reverse osmosis (RO) located downstream of said cartridge filter;
   a potential of hydrogen (pH) level control mechanism in fluid communication with said cartridge and RO filters, said pH control mechanism maintaining a desired pH level, water hardness level, ammonia level, and nitrite level in said water, said pH level control mechanism comprising a pH mixing chamber having two inlet connections and one outlet connection such that said pH mixing chamber receives water from said cartridge filter and said RO filter respectively, said mixing chamber receiving water from said cartridge filter via a manually adjustable pH control valve, wherein said desired pH level of said water is accomplished and maintained by mixing low pH water flowing from said RO filter with high pH water flowing from said cartridge filter in a proportionally controlled manner using said manually adjustable pH control valve, wherein said outlet connection of said pH mixing chamber provides water to said aquarium at said desired pH level;
   a plurality of valves in fluid communication with said cartridge filter and said RO filter for controlling a flow of said water into said aquarium while preventing back flow of said water out from said aquarium; and
   a waste water drain line in fluid communication with RO filter for directing waste water byproduct away from said aquarium filtration system.

6. The aquarium water filtration system of claim 5, wherein said valves comprise:
   a process water control valve located downstream of said pH level control mechanism;
   first and second automatic control valves located upstream and downstream of said RO filter respectively; and,
   an incoming water supply control valve located upstream of said cartridge filter.

7. The aquarium water filtration system of claim 6, wherein said valves further comprise:
   a process water valve located downstream of said pH level control mechanism; and
   an RO filter drain valve located downstream of said RO filter and being in fluid communication with said waste water drain line;
   wherein said first and second automatic control valves, when manually closed, equalize pressure within said aquarium water filtration system such that forward and backward flow of the water is prohibited within said aquarium water filtration system.

8. The aquarium water filtration system of claim 7, further comprising;
   a holding line is located downstream of said RO filter and is in fluid communication with said RO filter for providing backpressure to an output of the RO filter, said holding line including a large diameter conduit, a plumbing adapter, and a small diameter conduit engaged with said large diameter conduit via said plumbing adapter;
   wherein said water enters said large diameter conduit and is subsequently forced through said small diameter conduit thereby producing water flow resistance and pressurization of said water within said large diameter conduit which is in turn applied to a downstream side of said RO filter.

9. A method of utilizing the aquarium water filtration system recited in claim 5 for sequentially filtrating and balancing a water pH level in an aquarium while cooperating with an existing water level overflow unit of the aquarium for maintaining a maximum water level within the aquarium, said method comprising the steps of:
   providing an incoming water line and a cartridge filter;
   removing chlorine from water by fluidly communicating said cartridge filter with said incoming water line;
   providing and locating a reverse osmosis (RO) filter downstream of said cartridge filter;
   maintaining a desired pH level, water hardness level, ammonia level, and nitrite level in the water by providing and fluidly communicating a potential of hydrogen (pH) level control mechanism with said cartridge and said RO filters respectively;
   controlling a flow of the water into the aquarium while preventing back flow of the water out from the aquarium by providing and fluidly communicating a plurality of valves with said cartridge filter, said RO filter and said pH level control mechanism respectively; and
   directing waste water byproduct away from said aquarium water filtration system by providing and fluidly communicating a waste water drain line with said RO filter.

* * * * *